US012794760B2

(12) United States Patent
Singh et al.

(10) Patent No.: US 12,794,760 B2
(45) Date of Patent: *Nov. 10, 2026

(54) EVENT-BASED ANALYTICS TOOL FOR NETWORKS

(71) Applicant: AT&T Intellectual Property I, L.P., Atlanta, GA (US)

(72) Inventors: Dhruva Singh, Renton, WA (US); David Orloff, Issaquah, WA (US); Giritharan Rana, Basking Ridge, NJ (US); Sean Simon, Lynnwood, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 21 days.

This patent is subject to a terminal disclaimer.

(21) Appl. No.: 19/175,064

(22) Filed: Apr. 10, 2025

(65) Prior Publication Data

US 2025/0240200 A1 Jul. 24, 2025

Related U.S. Application Data

(63) Continuation of application No. 18/130,508, filed on Apr. 4, 2023, now Pat. No. 12,341,646.

(51) Int. Cl.

*H04L 41/0631* (2022.01)
*H04L 41/069* (2022.01)
*H04L 43/0823* (2022.01)

(52) U.S. Cl.

CPC ........ *H04L 41/0631* (2013.01); *H04L 41/069* (2013.01); *H04L 43/0823* (2013.01)

(58) Field of Classification Search

None

See application file for complete search history.

(56) References Cited

U.S. PATENT DOCUMENTS 10,124,893 B1 11/2018 Aalund
10,505,825 B1 * 12/2019 Bettaiah .................. G06F 16/22

(Continued)

FOREIGN PATENT DOCUMENTS

EP 1657693 A2 5/2006
EP 3952367 A1 2/2022

(Continued)

OTHER PUBLICATIONS

Elastic, "Elastic Announces the General Availability of Elastic Agent, General Availability of Support for Microsoft Azure Private Link, and New Visualization Capabilities in Kibana," Aug. 5, 2021, Retrieved online on Oct. 17, 2024. (Year: 2021).

(Continued)

*Primary Examiner* — Sandarva Khanal

(74) *Attorney, Agent, or Firm* — Guntin & Gust, PLC; Andrew Gust

(57) ABSTRACT

An event-based analytics tool can obtain, from a data lake, an instance of correlated event data including a first event from a first network device, a second event from a second network device, and data correlating the first event to the second event. The event-based analytics tool can obtain PCAP data from a troubleshooting server via a first application programming interface. The event-based analytics tool can also obtain a log from a searchable log database via a second application programming interface. Based on the correlated event data, the packet capture data, and the log, the event-based analytics tool can generate a prediction model that can be used to predict a cause of a future event.

20 Claims, 8 Drawing Sheets

(56) References Cited

U.S. PATENT DOCUMENTS

| | | | | |
|---|---|---|---|---|
| 10,855,536 | B1 * | 12/2020 | Blackburn | H04L 41/0631 |
| 11,252,052 | B1 * | 2/2022 | Babu Balasubramani | G06N 20/00 |
| 11,570,039 | B2 * | 1/2023 | Horgan | H04L 41/0645 |
| 11,966,820 | B2 * | 4/2024 | Ghatage | G06F 11/3006 |
| 12,299,119 | B2 * | 5/2025 | Ko | H04L 63/14 |
| 2008/0294384 | A1 * | 11/2008 | Fok | G06F 11/30 702/187 |
| 2013/0208115 | A1 | 8/2013 | Park | |
| 2014/0317040 | A1 | 10/2014 | Liu | |
| 2016/0188631 | A1 | 6/2016 | Deb | |
| 2016/0277268 | A1 * | 9/2016 | Brown | G06F 11/0778 |
| 2017/0223046 | A1 * | 8/2017 | Singh | H04L 63/1491 |
| 2017/0244745 | A1 | 8/2017 | Key | |
| 2018/0013636 | A1 | 1/2018 | Seetharamaiah | |
| 2018/0032387 | A1 | 2/2018 | Hiran | |
| 2018/0113773 | A1 * | 4/2018 | Krishnan | G06N 5/022 |
| 2018/0114234 | A1 * | 4/2018 | Fighel | G06Q 30/016 |
| 2018/0152362 | A1 | 5/2018 | Sanders | |
| 2018/0205666 | A1 | 7/2018 | Nash | |
| 2019/0012456 | A1 * | 1/2019 | Moore | G06N 20/00 |
| 2019/0097873 | A1 | 3/2019 | Nucci | |
| 2019/0349822 | A1 | 11/2019 | Kim | |
| 2019/0392286 | A1 | 12/2019 | Chen | |
| 2020/0021560 | A1 * | 1/2020 | Hefley | G06F 21/552 |
| 2020/0106660 | A1 | 4/2020 | Kakani | |
| 2020/0322361 | A1 * | 10/2020 | Ravindra | G06F 40/279 |
| 2020/0336508 | A1 | 10/2020 | Srivastava | |
| 2020/0341834 | A1 | 10/2020 | Safary | |
| 2021/0014710 | A1 | 1/2021 | Raju | |
| 2021/0117425 | A1 * | 4/2021 | Rao | H04L 41/0806 |
| 2021/0218764 | A1 * | 7/2021 | Lowney | H04L 63/1441 |
| 2022/0210199 | A1 | 6/2022 | Lanzi | |
| 2022/0265921 | A1 | 8/2022 | Gupta | |
| 2023/0016199 | A1 * | 1/2023 | Jividen | H04L 41/064 |
| 2023/0095870 | A1 | 3/2023 | Du | |
| 2023/0325511 | A1 | 10/2023 | Jaster | |
| 2023/0350736 | A1 * | 11/2023 | Agarwal | G06F 11/3495 |
| 2024/0137285 | A1 * | 4/2024 | Lukens | H04L 41/5032 |

FOREIGN PATENT DOCUMENTS

| | | | | |
|---|---|---|---|---|
| WO | WO-2010093674 A2 * | 8/2010 | | H04L 63/1408 |
| WO | WO-2014088912 A1 * | 6/2014 | | H04W 4/02 |
| WO | WO 2019196846 | 10/2019 | | |
| WO | WO-2020240072 A1 * | 12/2020 | | H04L 43/08 |
| WO | WO 2022056319 | 3/2022 | | |
| WO | WO-2022231776 A1 * | 11/2022 | | G06F 11/1433 |

OTHER PUBLICATIONS

Endace.com, "What is a PCAP file," Mar. 2023, Retrieved online on May 23, 2024 from https://web.archive.org/web/20230326080551/https://www.endace.com/learn/what-is-a-pcap-file. (Year: 2023).

Harris et al., "PPCAP Capture File Format," Dec. 2020, Retrieved online on May 23, 2024 from https://datatracker.ietf.org/doc/id/draft-gharris-opsawg-pcap-00.html. (Year: 2020).

U.S. Office Action mailed on Nov. 20, 2023 in U.S. Appl. No. 18/130,508.

U.S. Office Action mailed on Jun. 10, 2024 in U.S. Appl. No. 18/130,508.

U.S. Notice of Allowance mailed on Oct. 30, 2024 in U.S. Appl. No. 18/130,508.

* cited by examiner

108

| NorthRim Service | Snowflake DB-SMF -EDR | | Snowflake DB-AMF -EBM | | Snowflake DB-RAN -CTR | |
|---|---|---|---|---|---|---|
| | VARIABLE | EVENT | VARIABLE | EVENT | VARIABLE | EVENT |
| PDU Service | SUPI,IMEI, DNN, LOCATION ,NF | Cause Code : Internal :External | SUPI,IMEI, DNN, SLICE LOCATION ,NF | Cause Code : Internal :External | SUPI,IMEI, DNN, LOCATION ,NF | Cause Code : Internal :External |
| Paging Service | SUPI,IMEI, DNN, LOCATION ,NF | Cause Code : Internal :External | SUPI,IMEI, DNN, SLICE LOCATION ,NF | Cause Code : Internal :External | SUPI,IMEI, DNN, LOCATION ,NF | Cause Code : Internal :External |
| Mobility Service | SUPI,IMEI, DNN, LOCATION ,NF | Cause Code : Internal :External | SUPI,IMEI, DNN, SLICE LOCATION ,NF | Cause Code : Internal :External | SUPI,IMEI, DNN, LOCATION ,NF | Cause Code : Internal :External |
| Registration Service | SUPI,IMEI, DNN, LOCATION ,NF | Cause Code : Internal :External | SUPI,IMEI, DNN, SLICE LOCATION ,NF | Cause Code : Internal :External | SUPI,IMEI, DNN, LOCATION ,NF | Cause Code : Internal :External |

FIG. 5

EVENT-BASED ANALYTICS TOOL FOR NETWORKS

CROSS-REFERENCE TO RELATED APPLICATIONS

This application is a continuation of and claims priority to U.S. patent application Ser. No. 18/130,508, entitled "Event-Based Analytics Tool for Networks," filed Apr. 4, 2023, now allowed, which is incorporated herein by reference in its entirety.

BACKGROUND

Some mobility networks may have evolved from networks made up of single-function systems with fixed capacity into cloud-based networks made up of clustered virtual machines. This evolution has enabled virtualization of mobility infrastructure such as the radio access network ("RAN"), network core and user-plane services, among other parts of the mobility network.

As such, mobility and/or networking products and services have evolved to become more modular through containerization, more open, and less aggregated. As such, some applications that rely on real-time and/or low-latency application data may demand more edge compute resources to be deployed in more areas. To provide these and/or other functionality, some mobility networks are moving to cloud-based networks and/or may use hyperscalers at scale to leverage automation, scalability, and as a means of consuming large volumes of distributed data.

As a result, new signaling procedures between the elements of the mobility networks may be important for establishing, handling, treating, and/or rating mobility subscribers. Because of the increase in signaling, it is possible to experience collisions in signaling, incorrect session state handling between dissimilar contributing peer elements, or isolated faults to occur that can lead to service and session impacting outcomes.

But using probes or analyzing event data from single-function systems and/or other monolithic appliances or legacy mobility call flows may not provide enough information to operators. Similarly, the traditional dependency on using Key Performance Indicators ("KPIs") as a basis for fault detection may not be sufficient for services in a cloud-based architecture that can be scaled in or out by hyper-scaling technologies.

SUMMARY

The present disclosure is directed to an event-based analytics tool for networks. In some embodiments, the networks can include mobility networks operating as 5G networks, 6G networks, and/or other networks. According to some embodiments, a network can host and/or can include an event-based analytics tool. In some embodiments, the event-based analytics tool can be hosted and/or executed by an application server, a server computer, and/or other computing resources that can operate on and/or in communication with the network. In various embodiments of the concepts and technologies disclosed herein, the network also can include a data lake. The data lake can include data storage resources and compute resources that can be configured to obtain, from one or more network devices and via a bus, one or more events that can be associated with the one or more network devices of the network, to analyze the one or more events, to generate, based on the one or more events, correlated event data, and to store in a temporary or persistent data storage device or functionality, the correlated event data. In some embodiments, the data lake can publish or release the correlated event data to the event-based analytics tool instead of, or in addition to, storing the correlated event data.

The event-based analytics tool can be configured to obtain (e.g., by being provided with, by requesting and obtaining in response, and/or by pulling or obtaining via an application programming interface ("API") or the like), the correlated event data. In some embodiments, the correlated event data can include a table of data such as an event-based monitoring ("EBM") table, which can have one or more links for accessing other data. In particular, the event-based analytics tool can be configured to obtain (e.g., by using a link in the EBM table) one or more instances of packet capture ("PCAP") data from a troubleshooting device such as an NGXP server, and/or one or more logs or log entries (or other data structures) from a searchable log database such as an elasticsearch, logstash, and kibana ("ELK") stack or the like. The event-based analytics tool can be configured to obtain the PCAP data and the logs via one or more APIs, in some embodiments. It should be understood that this example is illustrative, and therefore should not be construed as being limiting in any way.

The event-based analytics tool can be configured to analyze the correlated event data, the PCAP data, and the logs to generate one or more signatures and/or other prediction models for particular faults, errors, or the like. The signatures can define, for particular errors or faults, known or expected or predicted causes. The signatures also can define one or more events that are known or expected or predicted to be captured by the data lake when a particular error or fault occurs on the network and/or in a device or other entity associated with the network. Thus, it can be appreciated that the event-based analytics tool can determine, based on some event detected in the future (e.g., after the signatures are generated), a known, predicted, or probable error, fault, or the like; a predicted and/or probable root cause; and/or possible remediation actions or triggers that can or should be taken to remediate the root cause(s). The signatures can be stored by the event-based analytics tool at a local data storage device (e.g., the server computer) and/or at one or more remote data storage devices.

The event-based analytics tool also can be configured to generate one or more prediction models in some embodiments (in addition to or instead of the signatures), though in some embodiments the signatures and the prediction models can be interchangeable. If created, the prediction models can be configured as algorithms or models that can be fed an event (e.g., a future event) as input and can produce as output a probable or predicted root cause. In some embodiments, the signatures can operate in a similar or same manner, so the signatures and/or the prediction models (if included) can be used to predict a root cause of a fault, error, or the like when a particular event is detected. The event-based analytics tool also can be configured to generate one or more tickets (for resolving the root cause of the fault, error, or the like), and in some embodiments the event-based analytics tool can take action or trigger other devices to take action to resolve the root cause of the fault, error, or the like. The event-based analytics tool can issue one or more commands that, when received by a device, resource, or other entity on the network can cause the device, resource, or other entity to resolve the fault, error, or the like. Thus, embodiments of the concepts and technologies disclosed herein can provide automated resolution of predicted root causes of faults, errors, or the like, based on receiving or detecting a single event. It should be understood that this example is illustrative, and therefore should not be construed as being limiting in any way.

According to one aspect of the concepts and technologies disclosed herein, a system is disclosed. The system can include a processor and a memory. The memory can store computer-executable instructions that, when executed by the processor, cause the processor to perform operations. The operations can include obtaining, from a data lake, an instance of correlated event data. The instance of correlated event data can include a first event generated by a first network device and obtained by the data lake via a bus, a second event generated by a second network device and obtained by the data lake via the bus, and data that correlates the first event to the second event. The operations further can include obtaining packet capture data from a troubleshooting server. Obtaining the packet capture data can include accessing the troubleshooting server via a first application programming interface and obtaining, via the first application programming interface, the packet capture data. The operations further can include obtaining a log from a searchable log database. Obtaining the log can include accessing the searchable log database via a second application programming interface and obtaining, via the second application programming interface, the log. The operations also can include generating, based on the instance of correlated event data, the packet capture data, and the log, a prediction model that can be used to predict a cause of a third event.

In some embodiments, the first network device can include an access management function and the first event can include an event-based monitoring event. In some embodiments, the first network device can include a session management function and the first event can include one of an endpoint detecting and response event or an event-based monitoring event. In some embodiments, the first network device can include a gNodeB and the first event can include one of a connect to resource event or a per-call measurement data event.

In some embodiments, the computer-executable instructions, when executed by the processor, can cause the processor to perform operations further including detecting the third event; providing, to the prediction model, the third event as input to the prediction model; and obtaining, as output from the prediction model, the cause of the third event. In some embodiments, the computer-executable instructions, when executed by the processor, can cause the processor to perform operations further including triggering remediation of the cause of the third event. In some embodiments, the computer-executable instructions, when executed by the processor, can cause the processor to perform operations further including automatically triggering remediation of the cause of the third event based on the prediction model.

According to another aspect of the concepts and technologies disclosed herein, a method is disclosed. The method can include obtaining, by a device including a processor and from a data lake in communication with the device via a network connection, an instance of correlated event data. The instance of correlated event data can include a first event generated by a first network device and obtained by the data lake via a bus, a second event generated by a second network device and obtained by the data lake via the bus, and data that correlates the first event to the second event. The method can further include obtaining, by the device, packet capture data from a troubleshooting server. Obtaining the packet capture data can include accessing the troubleshooting server via a first application programming interface and obtaining, via the first application programming interface, the packet capture data. The method also can include obtaining, by the device, a log from a searchable log database. Obtaining the log can include accessing the searchable log database via a second application programming interface and obtaining, via the second application programming interface, the log. The method also can include generating, by the device and based on the instance of correlated event data, the packet capture data, and the log, a prediction model that can be used to predict a cause of a third event.

In some embodiments, the first network device can include an access management function and the first event can include an event-based monitoring event. In some embodiments, the first network device can include a session management function and the first event can include one of an endpoint detecting and response event or an event-based monitoring event. In some embodiments, the first network device can include a gNodeB and the first event can include one of a connect to resource event or a per-call measurement data event.

In some embodiments, the method can further include detecting the third event; providing, to the prediction model, the third event as input to the prediction model; and obtaining, as output from the prediction model, the cause of the third event. In some embodiments, the method can further include triggering remediation of the cause of the third event. In some embodiments, the method can further include automatically triggering remediation of the cause of the third event based on the prediction model.

According to yet another aspect of the concepts and technologies disclosed herein, a computer storage medium is disclosed. The computer storage medium can store computer-executable instructions that, when executed by a processor, cause the processor to perform operations. The operations can include obtaining, from a data lake, an instance of correlated event data. The instance of correlated event data can include a first event generated by a first network device and obtained by the data lake via a bus, a second event generated by a second network device and obtained by the data lake via the bus, and data that correlates the first event to the second event. The operations further can include obtaining packet capture data from a troubleshooting server. Obtaining the packet capture data can include accessing the troubleshooting server via a first application programming interface and obtaining, via the first application programming interface, the packet capture data. The operations further can include obtaining a log from a searchable log database. Obtaining the log can include accessing the searchable log database via a second application programming interface and obtaining, via the second application programming interface, the log. The operations also can include generating, based on the instance of correlated event data, the packet capture data, and the log, a prediction model that can be used to predict a cause of a third event.

In some embodiments, the first network device can include an access management function and the first event can include an event-based monitoring event. In some embodiments, the first network device can include a session management function and the first event can include one of an endpoint detecting and response event or an event-based monitoring event. In some embodiments, the first network device can include a gNodeB and the first event can include one of a connect to resource event or a per-call measurement data event.

In some embodiments, the computer-executable instructions, when executed by the processor, can cause the processor to perform operations further including detecting the third event; providing, to the prediction model, the third event as input to the prediction model; and obtaining, as output from the prediction model, the cause of the third event. In some embodiments, the computer-executable instructions, when executed by the processor, can cause the processor to perform operations further including triggering remediation of the cause of the third event. In some embodiments, the computer-executable instructions, when executed by the processor, can cause the processor to perform operations further including automatically triggering remediation of the cause of the third event based on the prediction model.

Other systems, methods, and/or computer program products according to embodiments will be or become apparent to one with skill in the art upon review of the following drawings and detailed description. It is intended that all such additional systems, methods, and/or computer program products be included within this description and be within the scope of this disclosure.

BRIEF DESCRIPTION OF THE DRAWINGS

FIG. 5 illustrates an example embodiment of the correlated event data, according to one example embodiment of the concepts and technologies disclosed herein.

DETAILED DESCRIPTION

Figure 1:
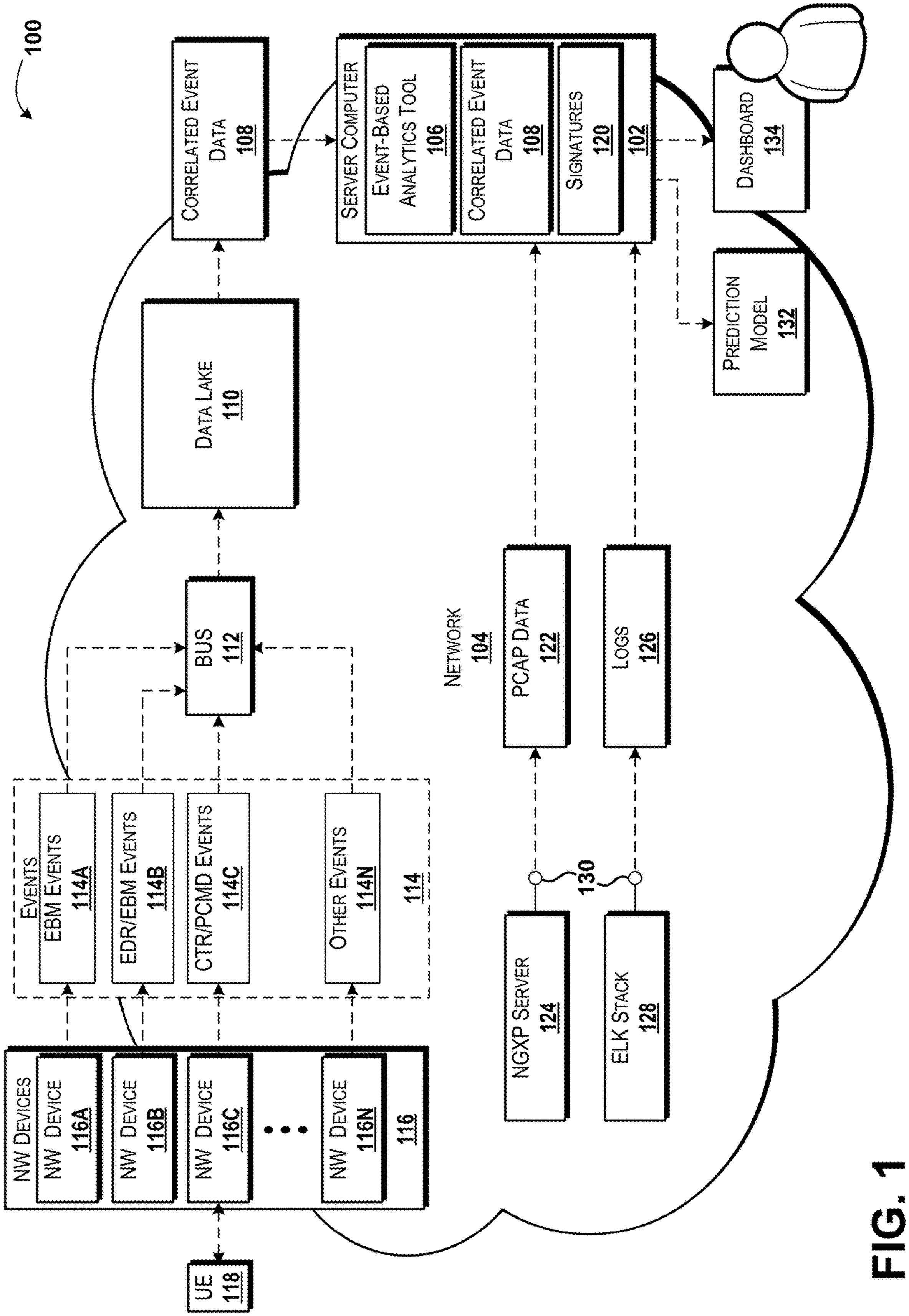
FIG. 1 is a system diagram illustrating an illustrative operating environment for various embodiments of the concepts and technologies described herein.

The following detailed description is directed to an event-based analytics tool for networks. A network can host and/or can include an event-based analytics tool. In some embodiments, the event-based analytics tool can be hosted and/or executed by an application server, a server computer, and/or other computing resources that can operate on and/or in communication with the network. In various embodiments of the concepts and technologies disclosed herein, the network also can include a data lake. The data lake can include data storage resources and compute resources that can be configured to obtain, from one or more network devices and via a bus, one or more events that can be associated with the one or more network devices of the network, to analyze the one or more events, to generate, based on the one or more events, correlated event data, and to store in a temporary or persistent data storage device or functionality, the correlated event data. In some embodiments, the data lake can publish or release the correlated event data to the event-based analytics tool instead of, or in addition to, storing the correlated event data.

The event-based analytics tool can be configured to obtain (e.g., by being provided with, by requesting and obtaining in response, and/or by pulling or obtaining via an API or the like), the correlated event data. In some embodiments, the correlated event data can include a table of data such as an EBM table, which can have one or more links for accessing other data. In particular, the event-based analytics tool can be configured to obtain (e.g., by using a link in the EBM table) one or more instances of PCAP data from a troubleshooting device such as an NGXP server, and/or one or more logs or log entries (or other data structures) from a searchable log database such as an ELK stack or the like. The event-based analytics tool can be configured to obtain the PCAP data and the logs via one or more APIs, in some embodiments. It should be understood that this example is illustrative, and therefore should not be construed as being limiting in any way.

The event-based analytics tool can be configured to analyze the correlated event data, the PCAP data, and the logs to generate one or more signatures and/or other prediction models for particular faults, errors, or the like. The signatures can define, for particular errors or faults, known or expected or predicted causes. The signatures also can define one or more events that are known or expected or predicted to be captured by the data lake when a particular error or fault occurs on the network and/or in a device or other entity associated with the network. Thus, it can be appreciated that the event-based analytics tool can determine, based on some event detected in the future (e.g., after the signatures are generated), a known, predicted, or probable error, fault, or the like; a predicted and/or probable root cause; and/or possible remediation actions or triggers that can or should be taken to remediate the root cause(s). The signatures can be stored by the event-based analytics tool at a local data storage device (e.g., the server computer) and/or at one or more remote data storage devices.

The event-based analytics tool also can be configured to generate one or more prediction models in some embodiments (in addition to or instead of the signatures), though in some embodiments the signatures and the prediction models can be interchangeable. If created, the prediction models can be configured as algorithms or models that can be fed an event (e.g., a future event) as input and can produce as output a probable or predicted root cause. In some embodiments, the signatures can operate in a similar or same manner, so the signatures and/or the prediction models (if included) can be used to predict a root cause of a fault, error, or the like when a particular event is detected. The event-based analytics tool also can be configured to generate one or more tickets (for resolving the root cause of the fault, error, or the like), and in some embodiments the event-based analytics tool can take action or trigger other devices to take action to resolve the root cause of the fault, error, or the like. The event-based analytics tool can issue one or more commands that, when received by a device, resource, or other entity on the network can cause the device, resource, or other entity to resolve the fault, error, or the like. Thus, embodiments of the concepts and technologies disclosed herein can provide automated resolution of predicted root causes of faults, errors, or the like, based on receiving or detecting a single event. It should be understood that this example is illustrative, and therefore should not be construed as being limiting in any way.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for an event-based analytics tool for networks will be described, according to an illustrative embodiment. The operating environment 100 shown in FIG. 1 includes a server computer 102. The server computer 102 can operate in communication with and/or as part of a communications network ("network") 104, though this is not necessarily the case. According to various embodiments of the concepts and technologies disclosed herein, the network 104 can include a carrier network, a mobility network, and/or various types of other networks (e.g., including the Internet), as will be illustrated and described below with reference to FIG. 6. For purposes of illustrating and describing the concepts and technologies disclosed herein, the network 104 is described herein as a carrier network and/or a portion thereof (e.g., a control plane of the carrier network, a core of the carrier network, an application layer of a cloud-based carrier network, combinations thereof, and/or the like). It should be understood that this example embodiment is illustrative, and therefore should not be construed as being limiting in any way.

According to various embodiments, the functionality of the server computer 102 may be provided by one or more server computers, one or more application servers, one or more work stations, one or more other computing systems, or the like. It should be understood that the functionality of the server computer 102 may be provided by a single device, by two or more similar devices, and/or by two or more dissimilar devices. For purposes of describing the concepts and technologies disclosed herein, the server computer 102 is described herein as a server computer. It should be understood that this embodiment is illustrative, and should not be construed as being limiting in any way.

The server computer 102 can execute an operating system (not labeled in FIG. 1) and one or more application programs such as, for example, an event-based analytics tool 106. The operating system can include a computer program that can be configured to control the operation of the server computer 102. The event-based analytics tool 106 can include an executable program that can be configured to execute on top of the operating system to provide various functions as illustrated and described herein.

In particular, the event-based analytics tool 106 can be configured to obtain, at various times, one or more release of correlated event data 108 from one or more data lake(s) 110. The data lake 110 can include hardware and/or software that can be configured to generate the correlated event data 108 as will be illustrated and described herein. In particular, the data lake 110 can be configured to receive, via a bus 112 or other functionality, one or more events 114A-N (hereinafter collectively and/or generically referred to as "events 114") and/or data describing events 114. In various embodiments of the concepts and technologies disclosed herein, the events 114 can be published, released, and/or injected into the bus 112 by one or more network devices 116A-N (hereinafter collectively and/or generically referred to as "network devices 116".

The data lake 110 can include logic and/or functionality for analyzing the events 114 obtained from the bus 112 and correlating the events 114 with one another to create the correlated event data 108. In some contemplated embodiments of the concepts and technologies disclosed herein, the correlated event data 108 can associate (e.g., via data associations and/or other data links) two or more events 114 with one another to show a relationship between the events 114. In one contemplated embodiment, the correlated event data 108 can correspond to an EBM table having links and/or other functionality for accessing other data (e.g., data from searchable databases and/or troubleshooting devices as will be illustrated and described herein in more detail). It should be understood that this example is illustrative, and therefore should not be construed as being limiting in any way.

According to various embodiments of the concepts and technologies disclosed herein, the network devices 116 can include various devices, software, and/or modules associated with the network 104, and the events 114 can correspond to events 114 generated by and/or output by the respective network devices 116. In particular, as shown in the illustrated embodiment of FIG. 1, the network device 116A (or any other of the network devices 116) can include, for example, an access and mobility management function ("AMF") that can be associated with the network 104. Similarly, the network device 116B (or any other of the network devices 116) can include a session management function ("SMF") that can be associated with the network 104. Still further, the network device 116C (or any other of the network devices 116) can include a gNodeB ("gNB") that can be associated with the network 104. Because the network devices 116 can include additional and/or alternative entities and/or devices, it should be understood that these examples are illustrative, and therefore should not be construed as being limiting in any way.

In the illustrated embodiment shown in FIG. 1, the network device 116C can correspond to a gNB and therefore can communicate with one or more user equipment 118 and/or other devices. Thus, it can be appreciated that the network device 116C also can have an interface with the user equipment 118 though this is not separately illustrated in FIG. 1. The network devices 116 also can include other devices such as, for example, a network exposure function ("NEF"), a policy charging function ("PCF"), an authentication server function ("AUSF"), a unified data management ("UDM"), a network repository function ("NRF"), a user plane function ("UPF"), and/or various interfaces between these and/or other devices or modules, one or more definition networks, other devices or modules, combinations thereof, or the like. The network devices 116 also can include network functions ("NFs") that can provide various functions and/or functionality for the network 104. Because many other additional and/or alternative network devices 116 are possible and are contemplated, it should be understood that these examples are illustrative and should not be construed as being limiting in any way.

According to various embodiments of the concepts and technologies disclosed herein, the events 114 can be generated or output by the network devices 116. Thus, it can be appreciated with reference to FIG. 1 that in some embodiments the events can include EBM events 114A (e.g., output by the AMF (e.g., the network device 116A (or any other of the network devices 116) in some embodiments) and/or other devices or modules). The events 114 further can include one or more endpoint detection and response ("EDR") events and/or other EBM events 114B, which can be output by the SMF (e.g., the network device 116B (or any other of the network devices 116) in some embodiments) and/or other devices or modules). The events 114 also can include one or more connect to resource ("CTR") events and/or per-call measurement data ("PCMD") events 114C (e.g., output by the gNB (e.g., the network device 116C (or any other of the network devices 116)) in some embodiments). The events 114 also can include other events 114N (e.g., output by network device 116N (or any other of the network devices 116) and/or other devices or modules). Because additional and/or alternative events 114 are possible and are contemplated, it should be understood that these examples are illustrative, and therefore should not be construed as being limiting in any way.

Because the events 114 provided by the various network devices 116 can be formatted in different formats in some embodiments, it can be appreciated that the interpretation of those events 114 typically may be in the realm of vendors that made and/or operate the network devices 116 that generated the events 114. As such, a particular event 114 may indicate that a fault or error has been detected at a particular device (e.g., an EBM event 114A may be generated by an AMF such as the network device 116A), but may not be useful to other devices or entities other than the associated network device 116 and/or a vendor or operator thereof.

As such, embodiments of the concepts and technologies disclosed herein provide functionality for collecting, at the data lake 110, the events 114 from the network devices 116 via a bus 112 (e.g., a messaging bus associated with the network 104) without regard to the formats of the events 114 and/or without regard to what manufacturer or operator made or operates the network devices 116. Furthermore, as will be explained herein, the interpretation and use of the events 114 to predict root causes or the like can be completed by parties other than the manufacturers and/or operators of the network devices 116. It should be understood that this example is illustrative, and therefore should not be construed as being limiting in any way.

According to various embodiments of the concepts and technologies disclosed herein, the data lake 110 can be configured to correlate the events 114 by, for example, determining that two or more events 114 obtained by the data lake 110 relate to the same communication, entity, user, device, transaction, or the like. For example, if the network 104 attempts to obtain data from the user equipment 118 for some reason (e.g., at the request of a particular network function or the like), the network 104 can request or otherwise trigger a communication with the user equipment 118 via a gNB or other network device 116 (e.g., the network device 116C). In an example implementation of an embodiment of the concepts and technologies disclosed herein, however, an error, fault, or failure may occur between the gNB and the user equipment 118 during the communication. As a result of the error, fault, or failure, the gNB (e.g., the network device 116C shown in FIG. 1) may be configured to generate a CTR/PCMD event 114C. The CTR/PCMD event 114C can describe the fault, error, or failure associated with the gNB and/or other network device 116 with which the user equipment 118 is communicating; the link or interface between the gNB or other network device 116 and the user equipment 118; or the like. Similarly, the requesting entity (e.g., the entity that requested the specific data from the user equipment 118) may or may not obtain the data it requested or needed and another event 114 may result from this failure, error, or the like (e.g., the requesting entity may generate an event 114 indicating the failure). Thus, it can be appreciated that multiple events 114 may relate to the same transaction, communication, user, device, or the like, in some embodiments. It should be understood that this example is illustrative, and therefore should not be construed as being limiting in any way.

According to various embodiments of the concepts and technologies disclosed herein, the data lake 110 can be configured to correlate the events 114 to one another to determine how events 114 may be connected (e.g., causally or the like). In some embodiments, for example, the data lake 110 may determine that a first event 114 at a first network device 116 will generally lead to a second event 114 at a second network device 116. Such a determination can indicate a connection between the first event 114 and the second event 114. In this and/or other situations or scenarios, the data lake 110 can be configured to generate, based on two or more detected events 114, connections between the events 114. The data lake 110 also can be configured to generate the correlated event data 108, which as noted above can include two or more events 114 and a data association between the two or more events 114. The correlated event data 108 can correlate multiple events 114 to a particular cause or the like, and therefore can be analyzed to understand how a particular fault, failure, error, or the like may result in specific events 114 in some embodiments. It should be understood that this example is illustrative, and therefore should not be construed as being limiting in any way.

According to various embodiments of the concepts and technologies disclosed herein, the data lake 110 can obtain the events 114 (via the bus 112), correlate the events 114 to create correlated event data 108, and publish, release, or otherwise make available (e.g., via a portal, API, or the like) the correlated event data 108 to the server computer 102 at various times. In various embodiments of the concepts and technologies disclosed herein, the correlated event data 108 can correspond to a table or other data structure (e.g., an EBM table) that can associate two or more events 114 to one another and/or to one or more causes thereof. Thus, the correlated event data 108 can be used to identify one or more causes, devices, users, entities, or the like associated with two or more events 114. It should be understood that this example is illustrative, and therefore should not be construed as being limiting in any way.

The event-based analytics tool 106 can be configured to obtain the correlated event data 108. According to various embodiments of the concepts and technologies disclosed herein, the event-based analytics tool 106 can also be configured to obtain PCAP data 122 from a device such as a troubleshooting system. In some embodiments, the troubleshooting system can include an NGXP server 124 or the like. The NGXP server 124 can be deployed, in some embodiments, to a cloud-native network such as a 5G network, a 6G network, and/or other embodiments of the network 104. It should be understood that this example is illustrative, and therefore should not be construed as being limiting in any way. Because various network entities can be configured to generate the PCAP data 122, it should be understood that the illustrated embodiment of FIG. 1 is illustrative and should not be construed as being limiting in any way. In some embodiments, the PCAP data 122 can be obtained from a network device 116.

The event-based analytics tool 106 also can be configured to obtain one or more logs 126. In some embodiments, the logs 126 can correspond to elastic logs (e.g., ELK logs) and therefore can be obtained, in some embodiments, from an ELK stack 128 or other searchable database or other functionality associated with the network 104. In various embodiments, the event-based analytics tool 106 can be configured to obtain the PCAP data 122 and the logs 126 from the respective sources of these data via respective APIs 130. Thus, in various embodiments of the concepts and technologies disclosed herein, the event-based analytics tool 106 can support API-based PCAP data mining and API-based ELK mining. It should be understood that this example is illustrative, and therefore should not be construed as being limiting in any way.

The event-based analytics tool 106 can be configured to analyze the correlated event data 108, the PCAP data 122, and the logs 126. Based on this analysis, the event-based analytics tool 106 can be configured to identify one or more faults, errors, or other causes associated with one or more events 114, one or more packet transmissions, one or more log entries, or the like. Based on this correlation and/or other analysis, the event-based analytics tool 106 can be configured to determine the relationships between the events 114, root causes, errors, and/or eventual remediation operations. Based on these and/or other determinations, the event-based analytics tool 106 can generate one or more signatures 120. The event-based analytics tool 106 also can be configured to store the signatures 120 at the server computer 102 and/or at other data storage devices or resources (e.g., in a database, a data server, an external storage device, or the like). It should be understood that this example is illustrative, and therefore should not be construed as being limiting in any way.

The signatures 120 can include data, algorithms, and/or models that can represent faults, errors, or the like. The signatures 120 also can represent and/or describe one or more events 114 that are or are expected or predicted to be associated with a particular type of fault, error, or the like. Still further, the signatures 120 also can represent and/or describe one or more remediation steps or operations that may be taken during ticketing/resolution processes associated with the fault, error, or the like.

Thus, it can be appreciated that the event-based analytics tool 106 can be configured to apply one or more machine learning algorithms, artificial intelligence, or the like to the correlated event data 108, the PCAP data 122, and the logs 126 to create the signatures 120. The event-based analytics tool 106 also can be configured to use the signatures 120 to determine, based on a future event 114, the PCAP data 122, the logs 126, the correlated event data 108, and/or a combination thereof, a probable or possible root cause associated with the event 114 (e.g., the cause of the events 114 as indicated by the signatures 120). In some embodiments, for example, a future event 114 can be provided to the signatures 120 as input, and the signatures 120 can determine, based on the input of the event 114, a root cause or the like. Thus, it can be appreciated that the event-based analytics tool 106 also can be configured to generate a prediction model 132 in some embodiments, which can be separate from the signatures 120 and/or that the signatures 120 can include and/or correspond to prediction models (e.g., given a particular event 114, the event-based analytics tool 106 can predict a cause of the event 114). As such, it should be understood that the prediction models 132 are not included in all embodiments. It should be understood that this example is illustrative, and therefore should not be construed as being limiting in any way.

According to various embodiments of the concepts and technologies disclosed herein, the prediction model 132 and/or the signatures 120 can be used by the event-based analytics tool 106 to enable proactive and/or predictive remediation of root causes of errors, faults, or the like based on one or more future events 114 detected by the event-based analytics tool 106 (e.g., one or more events 114 that occur after the creation of the signatures 120 and/or the prediction models 132). In some instances, the future event 114 can be determined based on an analysis of another release of the correlated event data 108 (e.g., a release of correlated event data 108 that occurred after the signatures and/or prediction models 132 were generated). In some embodiments, the server computer 102 can output the prediction model 132 and/or the signatures 120, store the prediction model 132 and/or the signatures 120, and/or use the prediction model 132 and/or the signatures 120 to provide the predictive and/or proactive fault detection and management as illustrated and described herein.

In some embodiments, as shown in FIG. 1, a user or other entity can interact with the event-based analytics tool 106 (e.g., via a portal, API, or the like) to request a dashboard 134. The dashboard 134 can include a graphical user interface for presenting one or more failures, errors, or the like, as well as possible causes of those failures or errors (e.g., root causes) as determined herein; events 114; root causes; other information; combinations thereof; or the like.

In some embodiments, a user or other entity can interact with the dashboard 134 to gauge network health and/or to detect and remediate errors, root causes, or the like. In some other embodiments, the event-based analytics tool 106 can be configured to automatically (e.g., without input and/or interactions from the user or other entity) output one or more commands (not labeled in FIG. 1) that, when received by a network resource (e.g., an orchestrator, operations management entity, a security platform, or the like), can create a ticket for resolving the identified root cause of the fault, error, or the like and/or resolve a ticket. Thus, the event-based analytics tool 106 can support automatic and/or autonomous ticketing and ticket resolution, where the ticketing and/or ticket resolution can be based on the events 114 detected by the event-based analytics tool 106. It should be understood that this example is illustrative, and therefore should not be construed as being limiting in any way.

In practice, a network 104 can host and/or can include an event-based analytics tool 106. In some embodiments, the event-based analytics tool 106 can be hosted and/or can be executed by a server computer 102 or other computing device. The network 104 also can include a data lake 110, which can be configured to obtain, from one or more network devices 116 and via a bus 112, one or more events 114 associated with the one or more network devices 116. The data lake 110 can be configured to obtain the events 114 and generate, based on the one or more events 114, correlated event data 108. The data lake 110 can publish or release the correlated event data 108 to the event-based analytics tool 106 or otherwise make the correlated event data 108 available to the event-based analytics tool 106.

The event-based analytics tool 106 can be configured to obtain the correlated event data 108. The event-based analytics tool 106 also can be configured to obtain PCAP data 122 and logs 126 from devices such as an NGXP server 124, an ELK stack 128, or the like. In some embodiments, as noted above, the correlated event data 108 can include a data structure (e.g., an EBM table) that can have links or other references for accessing other data such as the PCAP data 122 and the logs 126. The event-based analytics tool 106 can be configured to obtain the PCAP data 122 and the logs 126 via one or more APIs 130, a portal, a service call, other functionality, and/or via other manners. It should be understood that this example is illustrative, and therefore should not be construed as being limiting in any way.

The event-based analytics tool 106 can be configured to analyze the correlated event data 108, the PCAP data 122, and the logs 126 to determine one or more signatures 120 or other prediction models 132 for particular faults, errors, or the like. The signatures 120 can define, for particular errors or faults, known or expected causes, as well as one or more events 114 that are known or expected to be captured by the data lake 110 when a particular error or fault occurs. Thus, it can be appreciated that the event-based analytics tool 106 can determine, based on detecting some future event 114, a known, predicted, or probable error, fault, or the like can be determined as a probable root cause. In some embodiments, as noted above, the future event 114 can be fed to the signatures 120 and/or other prediction model 132 as input and the root cause can be obtained as output from the signatures 120 and/or the prediction model 132. The signatures 120 and/or the prediction model 132 can be stored by the event-based analytics tool 106 at a local data storage device (e.g., the server computer 102) and/or at one or more remote data storage devices. It should be understood that this example is illustrative, and therefore should not be construed as being limiting in any way.

The event-based analytics tool 106 also can be configured to generate one or more tickets for remediating a predicted or known root cause of a fault, error, or the like when a particular (future) event 114 is detected. The event-based analytics tool 106 can be configured to generate one or more tickets (for resolving the root cause of the fault, error, or the like). The tickets can be autonomously and/or automatically generated based on past remediation of similar faults or errors, in some embodiments. In some embodiments the event-based analytics tool 106 can take action or trigger other devices to take action to resolve the predicted root cause of the fault, error, or the like.

Thus, though not labeled in FIG. 1, the event-based analytics tool 106 can issue one or more commands that, when received by a device, resource, or other entity on the network 104 can cause the device, resource, or other entity to resolve the fault, error, or the like. Thus, embodiments of the concepts and technologies disclosed herein can provide automated and/or autonomous resolution of predicted root causes of faults, errors, or the like, based on receiving or detecting a single event 114. It should be understood that this example is illustrative, and therefore should not be construed as being limiting in any way.

FIG. 1 illustrates one server computer 102, one network 104, one data lake 110, one bus 112, four network devices 116, one user equipment 118, one NGXP server 124, and one ELK stack 128. It should be understood, however, that various implementations of the operating environment 100 can include zero, one, or more than one server computer 102; one or more than one network 104; one or more than one data lake 110; one or more than one bus 112; one, two, three, four, or more than four network devices 116, one or more than one user equipment 118, one or more than one NGXP server 124, and/or one or more than one ELK stack 128. As such, the illustrated embodiment should be understood as being illustrative, and should not be construed as being limiting in any way.

Figure 2:
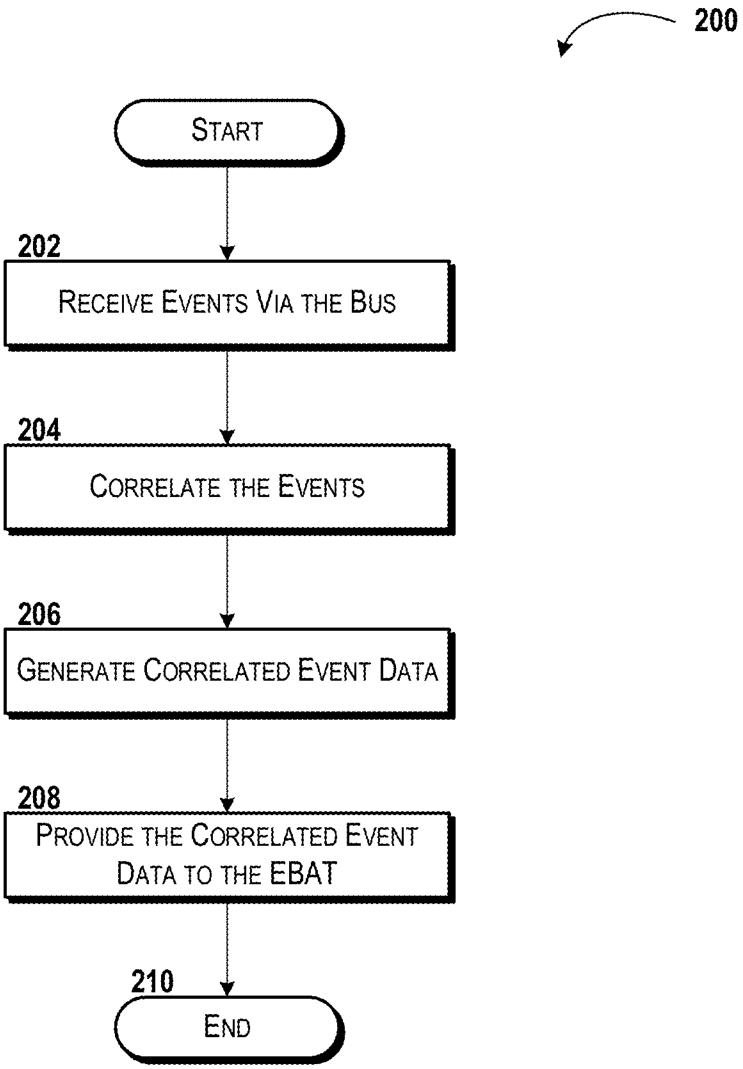
FIG. 2 is a flow diagram showing aspects of a method for generating correlated event data based on events, according to an illustrative embodiment of the concepts and technologies described herein.

Turning now to FIG. 2, aspects of a method 200 for generating correlated event data based on events will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the server computer 102 or the data lake 110, to perform one or more operations and/or causing the processor to direct other components of the computing system or device to perform one or more of the operations.

For purposes of illustrating and describing the concepts of the present disclosure, the method 200 is described herein as being performed by the data lake 110 via execution of one or more software modules. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 200 can begin at operation 202. At operation 202, the data lake 110 can receive events 114, for example via the bus 112. As explained herein and illustrated in FIG. 1, the events 114 received in operation 202 can be released by one or more network devices 116. The events 114 can be published, released, or injected in the bus 112 by the network devices 116 at various times. For example, the events 114 can be released or injected into the bus 112 when a network event (e.g., a connection, a lost connection, dropped data, a transaction, a failure of a device, or the like) is detected by the network devices 116 and/or when a failure, error, or the like is detected by the network devices 116. Thus, it can be appreciated that the events 114 can be provided to the bus 112 at various times and obtained by the data lake 110 at various times. As such, it can be appreciated that the functionality of operation 202 for receiving events 114 can be iterated a number of times in some embodiments before the method 200 proceeds to operation 204, though this is not necessary the case.

Additionally, it can be appreciated that in some embodiments a particular error, fault, or the like, may result in two or more events 114 being generated at two or more network devices 116 simultaneously, contemporaneously, and/or at different times. As such, it should be appreciated that a number of events 114 may be received in operation 202 from a number of network devices 116. According to various embodiments of the concepts and technologies disclosed herein, two or more events 114 can be obtained in operation 202 from two or more network devices 116. This embodiment is described for purposes of explaining the concepts and technologies disclosed herein, and therefore should not be construed as being limiting in any way.

From operation 202, the method 200 can proceed to operation 204. At operation 204, the data lake 110 can correlate the events 114 obtained in operation 202. According to various embodiments of the concepts and technologies disclosed herein, the data lake 110 can be configured to correlate events 114 that are determined, by the data lake 110, to be related to one another. The determination of what events 114 are related to one another can be based, in some embodiments, on various logic such as machine learning algorithms, event tables, data structures (that associate events 114 to one another), or the like. Thus, the data lake 110 can determine if any events 114 relate to the same activity, device, user, error, fault, or the like. It should be understood that this example is illustrative, and therefore should not be construed as being limiting in any way.

By way of example, a user equipment 118 may be connected to the network device 116 and may have a downlink speed that that does not meet a defined threshold for the downlink speed defined for that connection. In response to this error or fault, the network device 116 may generate a first event 114 (e.g., one of the CTR/PCMD events 114C), and this event 114 can be obtained by the data lake 110 in operation 202. The same connection may have another fault or error such as, for example, dropped packets, an uplink speed that does not meet a defined threshold, a latency that exceeds a threshold, or the like, and this other issue may trigger a release or publication of a second event 114. The data lake 110 can be configured to correlate the first event 114 to the second event 114 to indicate that the same fault, error, or other cause may be causing both events 114. Thus, operation 204 can correspond to the data lake 110 applying various types of logic or functionality to identify related events 114 and to correlate the events 114 to one another (e.g., to create data associations between the two or more events 114). Because data associations and/or other correlations between events 114 can be indicated in various manners, it should be understood that this example is illustrative, and therefore should not be construed as being limiting in any way.

From operation 204, the method 200 can proceed to operation 206. At operation 206, the data lake 110 can generate an instance of correlated event data 108. It can be appreciated from the above description that events 114 can be obtained by the data lake 110 at multiple times, and therefore the data lake 110 can be configured to correlate the events 114 at multiple times and/or to generate multiple instances of correlated event data 108. In some embodiments of the concepts and technologies disclosed herein, the data lake 110 can be configured to correlate events 114 that are obtained within a specified amount of time of one another (e.g., within ten milliseconds of one another, within one second of one another, within ten seconds of one another, within one minute of one another, etc.), though this is not necessarily the case in all embodiments. In some other embodiments, the data lake 110 can be configured to generate an instance of correlated event data 108 for events 114 associated with the same network event (e.g., a communication session such as a call or data session, a transaction, or the like), the same user, the same device, the same location, combinations thereof, or the like.

At any rate, the data lake 110 can be configured to generate the correlated event data 108, which can include a data file or data structure that can include data representing the events 114 and data associations between the events 114. The data associations can define what events 114 are related to one another, a cause associated with the events 114 (if known), ticketing and/or resolution information for remediating and/or triggering remediation of the events 114 (if known), combinations thereof, or the like. The data lake 110 can store the correlated event data 108 in some embodiments, or provide the correlated event data 108 to other entities.

From operation 206, the method 200 can proceed to operation 208. At operation 208, the data lake 110 can provide the correlated event data to the event-based analytics tool 106. In some embodiments, the event-based analytics tool 106 may request the correlated event data 108 from the data lake 110. In some other embodiments, the data lake 110 can provide each instance of the correlated event data 108 generated by the data lake 110 to the event-based analytics tool 106. In yet other embodiments, the data lake 110 can expose an API or other functionality to enable the event-based analytics tool 106 to obtain the correlated event data 108. Because the correlated event data 108 can be made available to the event-based analytics tool 106 in additional and/or alternative manners, it should be understood that these examples are illustrative, and therefore should not be construed as being limiting in any way.

From operation 208, the method 200 can proceed to operation 210. The method 200 can end at operation 210.

Figure 3:
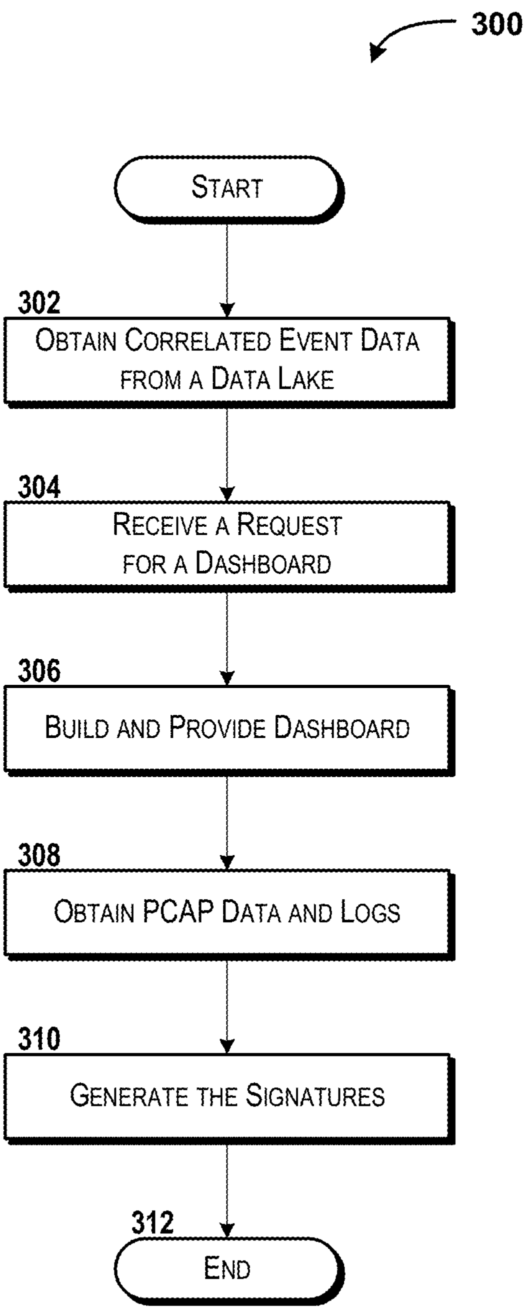
FIG. 3 is a flow diagram showing aspects of a method for generating signatures using an event-based analytics tool, according to an illustrative embodiment of the concepts and technologies described herein.

Turning now to FIG. 3, aspects of a method 300 for generating signatures 120 using an event-based analytics tool 106 will be described in detail, according to an illustrative embodiment. For purposes of illustrating and describing the concepts of the present disclosure, the method 300 is described herein as being performed by the server computer 102 via execution of one or more software modules such as, for example, the event-based analytics tool 106. It should be understood that additional and/or alternative devices and/or network nodes can provide the functionality described herein via execution of one or more modules, applications, and/or other software including, but not limited to, the event-based analytics tool 106. Thus, the illustrated embodiments are illustrative, and should not be viewed as being limiting in any way.

The method 300 begins at operation 302. At operation 302, the server computer 102 can obtain the correlated event data 108 from the data lake 110. As explained above, the server computer 102 can obtain the correlated event data 108 in various manners. In some embodiments, for example, the data lake 110 can be configured to provide the correlated event data to the server computer 102, so operation 302 can correspond to the server computer 102 receiving the correlated event data 108 from the data lake 110. In some other embodiments, the server computer 102 can request the correlated event data 108 from the data lake 110, so operation 302 can correspond to the server computer 102 sending, to the data lake 110, a request for the correlated event data 108 and the server computer 102 receiving the correlated event data 108 from the data lake 110 in response to the request. In some other embodiments, the server computer 102 can access an API exposed by the data lake 110 to access (and obtain) the correlated event data 108. Because the correlated event data 108 can be made available to the event-based analytics tool 106 in additional and/or alternative manners, it should be understood that these examples are illustrative, and therefore should not be construed as being limiting in any way.

From operation 302, the method 300 can proceed to operation 304. At operation 304, the server computer 102 can receive a request for a dashboard 134. The request for the dashboard 134 can be created by a user or other entity. For example, as explained above, the dashboard 134 can be requested by a user or other entity to view and/or access various events 114 (e.g., as included in the correlated event data 108). In some embodiments, the dashboard 134 can be requested by the user or other entity via a browser, a portal, an API, or other functionality associated with the server computer 102. It should be understood that this example is illustrative, and therefore should not be construed as being limiting in any way.

From operation 304, the method 300 can proceed to operation 306. At operation 306, the server computer 102 can build the dashboard 134 and provide the dashboard 134 to the user or other entity (e.g., to the browser, portal, or the like via which the request for the dashboard was received). In various embodiments of the concepts and technologies disclosed herein, the dashboard 134 generated in operation 306 can include the correlated event data 108. It should be understood that this example is illustrative, and therefore should not be construed as being limiting in any way.

In one contemplated embodiment of the concepts and technologies disclosed herein, the correlated event data 108 can include and/or can correspond to an EBM table. The EBM table can include a table of events 114 captured by the data lake 110, as explained above, and these events 114 can be correlated to one another and/or associated (e.g., via data associations) with one another. In some embodiments, the EBM table can include one or more links or other functionality for accessing the PCAP data 122 and/or logs 126. An example of the EBM table is illustrated and described below with reference to FIG. 4. It should be understood that this example is illustrative, and therefore should not be construed as being limiting in any way.

From operation 306, the method 300 can proceed to operation 308. At operation 308, the server computer 102 can obtain the PCAP data 122 and the logs 126 from one or more devices or resources such as, for example, the NGXP server 124, the ELK stack 128, or the like. In some embodiments, the server computer 102 can obtain the PCAP data 122 and the logs 126 via APIs 130 exposed by the NGXP server 124 and the ELK stack 128. In some embodiments, the server computer 102 can access the API 130 via one or more links included in the correlated event data 108 as noted above. Because the server computer 102 can access the PCAP data 122 and the logs 126 in additional and/or alternative manners, it should be understood that these examples are illustrative, and therefore should not be construed as being limiting in any way.

From operation 308, the method 300 can proceed to operation 310. At operation 310, the server computer 102 can generate the signatures 120 and/or other embodiments of prediction models 132. As noted above, the prediction model 132 can correspond to the signatures 120, in some embodiments. The server computer 102 can correlate the correlated event data 108 to the PCAP data 122 and the logs 126 to determine, for any particular event 114 and/or number of events 114, how the events 114 are related and/or correlated to one another, and how the PCAP data 122 and/or the logs 126 may reflect the cause associated with the events 114. Thus, operation 310 can correspond to the server computer 102 generating, for a particular user, transaction, device, root cause, or the like the signatures 120. The signature 120 can define behavior known, expected, and/or predicted to exist when a particular error, fault, or the like occurs on the network 104.

The signatures 120 can be used as and/or can be supplemented by the prediction models 132 to determine, based on a detected (future) event 114 at some future moment in time (e.g., some point in time after the signatures 120 have been generated and/or stored), what predicted root cause is associated with the event 114. Thus, for example, if a particular event 114 is detected, the server computer 102 can provide the event 114 to the prediction model 132 (e.g., the signatures 120) as input, and output from the prediction model 132 (or the signatures 120) can correspond to identification of a root cause of the failure, error, or the like. Thus, the root cause can be automatically and/or autonomously determined using the signatures 120 and/or the prediction model 132 based on a future event 114 detected. Additional functionality for identifying a cause of an event will be illustrated and described below with reference to FIG. 4.

From operation 310, the method 300 can proceed to operation 312. The method 300 can end at operation 312.

Figure 4:
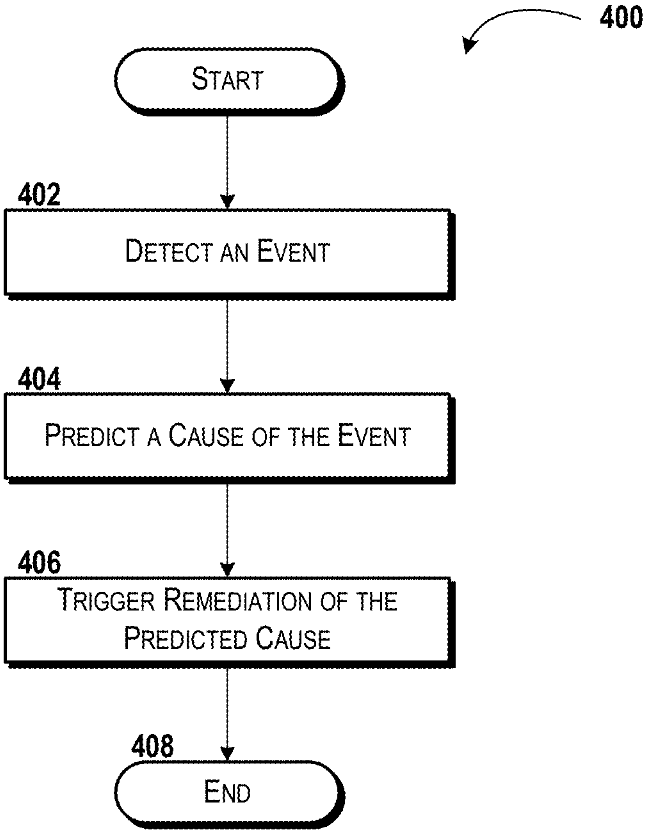
FIG. 4 is a flow diagram showing aspects of a method for predicting and remediating a cause of an event using an event-based analytics tool, according to an illustrative embodiment of the concepts and technologies described herein.

Turning now to FIG. 4, aspects of a method 400 for predicting and remediating a cause of an event 114 using an event-based analytics tool 106 will be described in detail, according to an illustrative embodiment. As noted above, the cause of a detected event can be automatically and/or autonomously determined in some embodiments of the concepts and technologies disclosed herein.

For purposes of illustrating and describing the concepts of the present disclosure, the method 400 is described herein as being performed by the server computer 102 via execution of one or more software modules such as, for example, the event-based analytics tool 106. It should be understood that additional and/or alternative devices and/or network nodes can provide the functionality described herein via execution of one or more modules, applications, and/or other software including, but not limited to, the event-based analytics tool 106. Thus, the illustrated embodiments are illustrative, and should not be viewed as being limiting in any way.

The method 400 begins at operation 402. At operation 402, the server computer 102 can detect an event 114. An event 114 can be detected in any number of manners including, but not limited to, obtaining an indication or message that identifies the events 114, by requesting events 114 from the network devices 116, or the like. In some embodiments, the event-based analytics tool 106 can be configured to obtain events 114 or correlated event data 108 at various times for a determination of a root cause associated with the event 114. In yet other embodiments, the server computer 102 can detect another event 114 by receiving another iteration or instance of the correlated event data 108. Because the event 114 can be detected in operation 402 in a number of manners in addition to and/or instead of the above example embodiments, it should be understood that this example is illustrative, and therefore should not be construed as being limiting in any way.

From operation 402, the method 400 can proceed to operation 404. At operation 404, the server computer 102 can predict a cause of the event 114 detected in operation 402. As noted above, the event 114 obtained in operation 402 can be provided to the prediction model 132 or signatures 120 as input and/or otherwise correlated to the prediction model 132 or signatures 120 to predict a cause of the event 114 detected in operation 402. As such, the server computer 102 can be configured to automatically and/or autonomously predict a cause of a fault, error, or the like, as soon as one event 114 is detected by the server computer 102. Thus, instead of having to obtain an end-to-end view of the network 104 to identify a root cause of an event (e.g., by determining some performance indicator for links between devices), embodiments of the concepts and technologies disclosed herein can enable prediction of a failure or error based only on one event 114, and faults or errors in the network 104 can be remediated after detecting only one event 114 (e.g., much quicker than would be possible if waiting for an end-to-end view of the network 104 and/or the associated fault). Thus, some embodiments of the concepts and technologies disclosed herein can predict a root cause for an event 114 based only on one event (without obtaining performance indicators such as KPIs from a network). Similarly, some embodiments of the concepts and technologies disclosed herein can automatically and/or autonomously determine how to remediate a predicted root cause for an event 114 based only on one event (without manual interactions and/or instructions). It should be understood that this example is illustrative, and therefore should not be construed as being limiting in any way.

From operation 404, the method 400 can proceed to operation 406. The server computer can trigger remediation of the cause predicted in operation 404 for the event 114 detected in operation 402. As noted above, operation 406 can occur autonomously and/or automatically in some embodiments. The server computer 102 can output one or more commands or triggers to one or more network devices 116 or other network resources or entities. The commands or triggers can include executable code that, when executed by other devices or entities, can cause various devices, resources, or other entities to create a ticket and resolve the ticket to fix or otherwise remediate the cause of the event 114.

For example, if an event 114 relates to a dropped connection between a gNB and the user equipment 118 and the predicted root cause is a radio tuning issue, the command or trigger generated in operation 406 can correspond to a command for tuning the radio to correct the radio tuning issue and/or instructions for devices to tune the radio to correct the radio tuning issue. As such, it can be appreciated that some embodiments of the concepts and technologies disclosed herein can include the automated resolution of a root cause based on a single detected event 114 without an end-to-end view of the network 104 and/or without relying on performance metrics (e.g., KPIs) and/or a perspective of a user device such as the user equipment 118. It should be understood that this example is illustrative, and therefore should not be construed as being limiting in any way.

From operation 406, the method 400 can proceed to operation 408. The method 400 can end at operation 408.

FIG. 5 shows an example embodiment of the correlated event data 108, according to one example embodiment. As can be appreciated with reference to FIG. 5, the correlated event data 108 can include an EBM table. It can be appreciated with reference to FIG. 5 how the events depicted in the EBM table can be correlated to one another (e.g., through the use of rows and/or columns, through data associations, or the like). Additionally, as shown in FIG. 5, the correlated event data 108 can include variables for events, and these variables can be used to determine root causes, possible remediation, and the like. It should be understood that the example embodiment shown in FIG. 5 is purely illustrative of one embodiment of the concepts and technologies disclosed herein. It should be understood that this example is illustrative, and therefore should not be construed as being limiting in any way.

Figure 6:
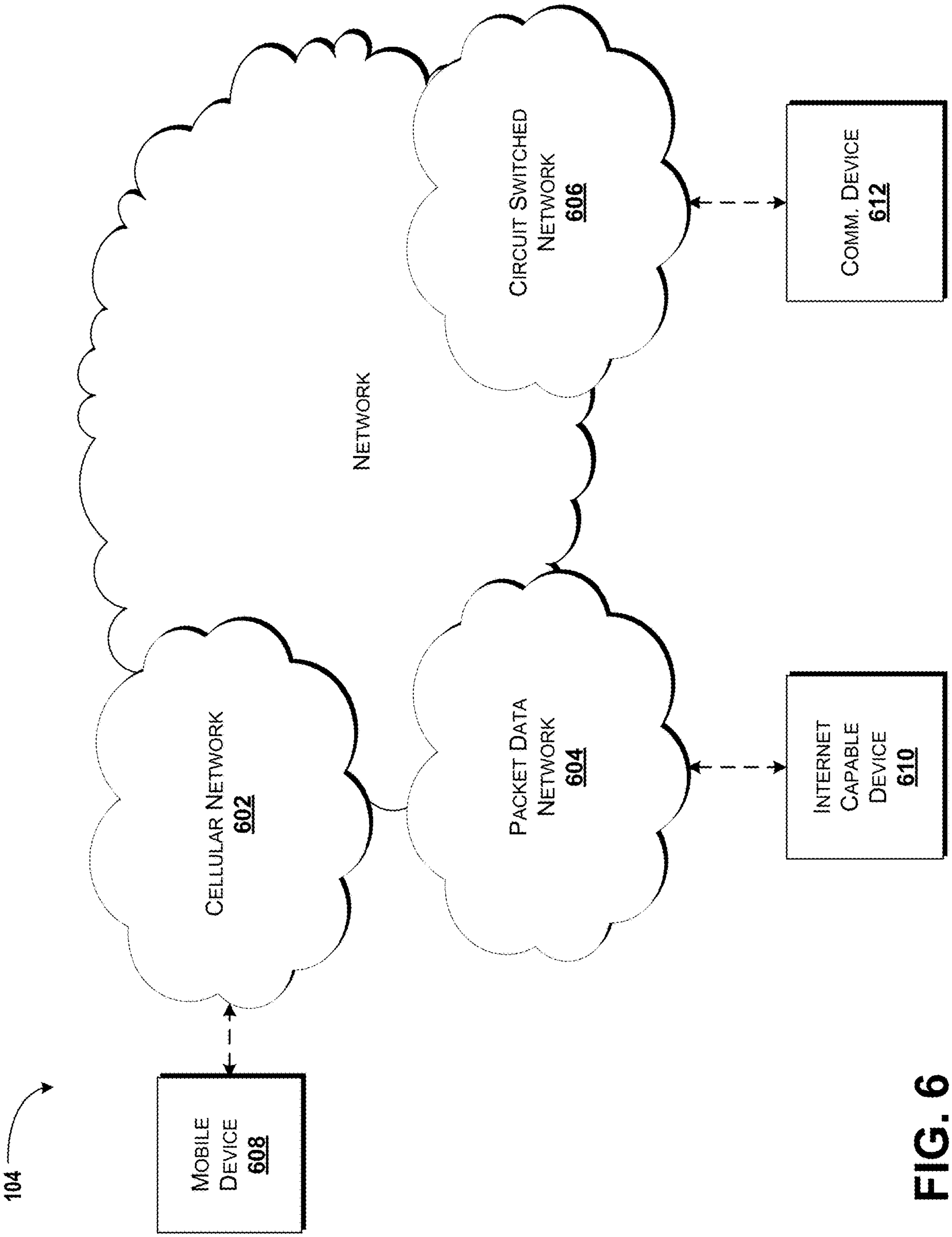
FIG. 6 schematically illustrates a network, according to an illustrative embodiment of the concepts and technologies described herein.

Turning now to FIG. 6, additional details of the network 104 are illustrated, according to an illustrative embodiment. The network 104 includes a cellular network 602, a packet data network 604, for example, the Internet, and a circuit switched network 606, for example, a publicly switched telephone network ("PSTN"). The cellular network 602 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 602 also includes radios and nodes for receiving and transmitting voice, data, and combinations thereof to and from radio transceivers, networks, the packet data network 604, and the circuit switched network 606.

A mobile communications device 608, such as, for example, a cellular telephone, a user equipment, a mobile terminal, a PDA, a laptop computer, a handheld computer, and combinations thereof, can be operatively connected to the cellular network 602. The cellular network 602 can be configured as a 2G GSM network and can provide data communications via GPRS and/or EDGE. Additionally, or alternatively, the cellular network 602 can be configured as a 3G UMTS network and can provide data communications via the HSPA protocol family, for example, HSDPA, EUL (also referred to as HSUPA), and HSPA+. The cellular network 602 also is compatible with 4G mobile communications standards, 5G mobile communications standards, 6G mobile communication standards, other mobile communications standards, and evolved and future mobile communications standards.

The packet data network 604 includes various devices, for example, servers, computers, databases, and other devices in communication with one another, as is generally known. The packet data network 604 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 604 includes or is in communication with the Internet. The circuit switched network 606 includes various hardware and software for providing circuit switched communications. The circuit switched network 606 may include, or may be, what is often referred to as a plain old telephone system (POTS). The functionality of a circuit switched network 606 or other circuit-switched network are generally known and will not be described herein in detail.

The illustrated cellular network 602 is shown in communication with the packet data network 604 and a circuit switched network 606, though it should be appreciated that this is not necessarily the case. One or more Internet-capable devices 610, for example, a PC, a laptop, a portable device, or another suitable device, can communicate with one or more cellular networks 602, and devices connected thereto, through the packet data network 604. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, or the like, can be in communication with the circuit switched network 606, and therethrough to the packet data network 604 and/or the cellular network 602. It should be appreciated that the communications device 612 can be an Internet-capable device, and can be substantially similar to the Internet-capable device 610. In the specification, the network 104 is used to refer broadly to any combination of the networks 602, 604, 606. It should be appreciated that substantially all of the functionality described with reference to the network 104 can be performed by the cellular network 602, the packet data network 604, and/or the circuit switched network 606, alone or in combination with other networks, network elements, and the like.

Figure 7:
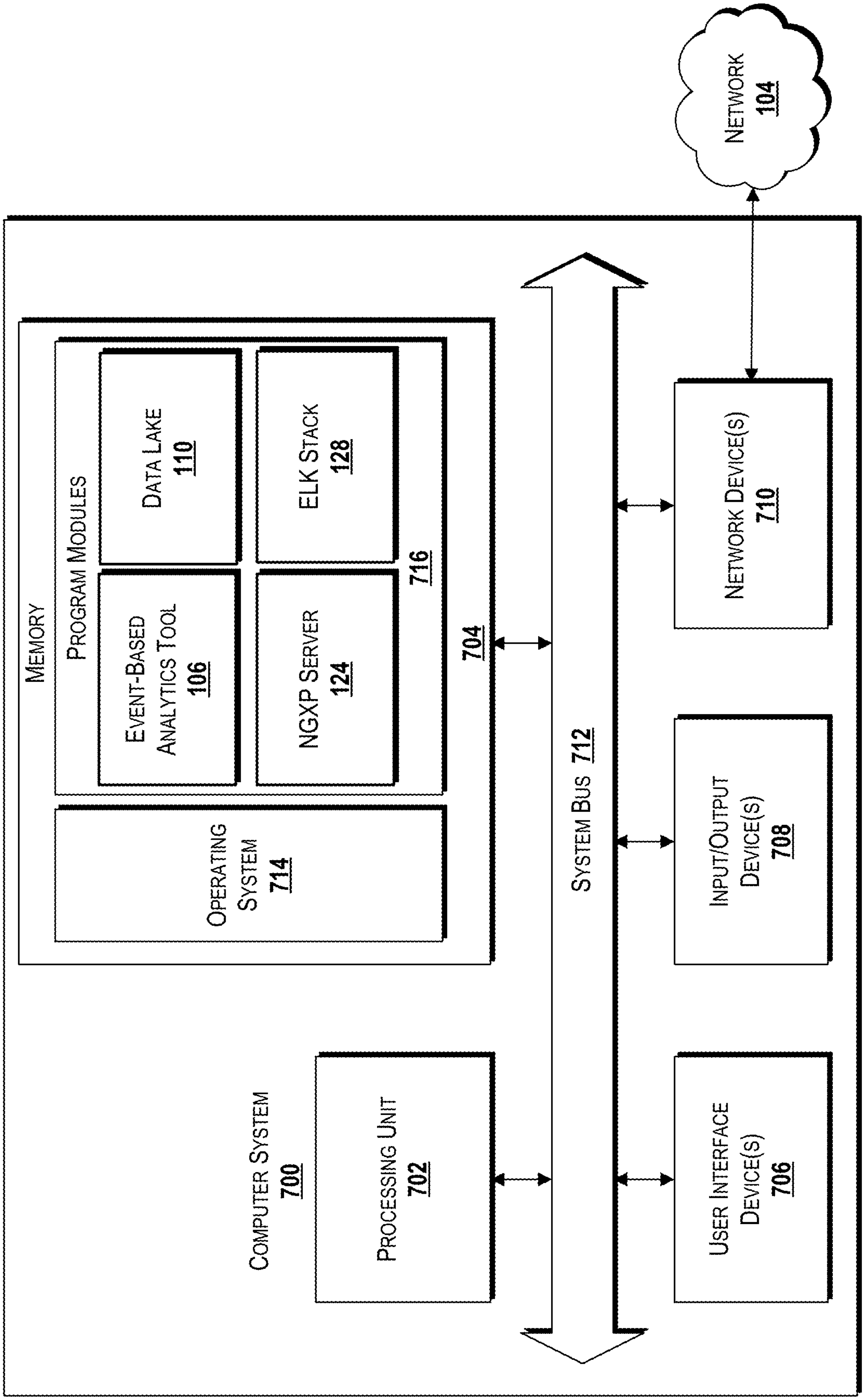
FIG. 7 is a block diagram illustrating an example computer system configured to provide an event-based analytics tool for networks, according to some illustrative embodiments of the concepts and technologies described herein.

FIG. 7 is a block diagram illustrating a computer system 700 configured to provide the functionality described herein for an event-based analytics tool 106, in accordance with various embodiments of the concepts and technologies disclosed herein. The computer system 700 includes a processing unit 702, a memory 704, one or more user interface devices 706, one or more input/output ("I/O") devices 708, and one or more network devices 710, each of which is operatively connected to a system bus 712. The bus 712 enables bi-directional communication between the processing unit 702, the memory 704, the user interface devices 706, the I/O devices 708, and the network devices 710.

The processing unit 702 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 704 communicates with the processing unit 702 via the system bus 712. In some embodiments, the memory 704 is operatively connected to a memory controller (not shown) that enables communication with the processing unit 702 via the system bus 712. The memory 704 includes an operating system 714 and one or more program modules 716. The operating system 714 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 716 may include various software and/or program modules described herein. In some embodiments, for example, the program modules 716 include the event-based analytics tool 106, the data lake 110, the network devices 116, the NGXP server 124, and/or the ELK stack 128. These and/or other programs can be embodied in computer-readable media containing instructions that, when executed by the processing unit 702, perform one or more of the methods 200, 300, 400 described in detail above with respect to FIGS. 2-4 and/or other functionality as illustrated and described herein. It can be appreciated that, at least by virtue of the instructions embodying the methods 200, 300, 400, and/or other functionality illustrated and described herein being stored in the memory 704 and/or accessed and/or executed by the processing unit 702, the computer system 700 is a special-purpose computing system that can facilitate providing the functionality illustrated and described herein. According to embodiments, the program modules 716 may be embodied in hardware, software, firmware, or any combination thereof. Although not shown in FIG. 7, it should be understood that the memory 704 also can be configured to store the correlated event data 108, the signatures 120, the PCAP data 122, the logs 126, the prediction model 132, the dashboard 134, and/or other data, if desired. It also can be appreciated that in some embodiments the prediction model 132 and/or the signatures 120 can correspond to models and/or collections of algorithms and therefore may be stored as program modules or software in some embodiments. It should be understood that this example is illustrative, and therefore should not be construed as being limiting in any way.

By way of example, and not limitation, computer-readable media may include any available computer storage media or communication media that can be accessed by the computer system 700. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes only non-transitory embodiments of computer readable media as illustrated and described herein. Thus, computer storage media can include volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 700. In the claims, the phrase "computer storage medium" and variations thereof does not include waves or signals per se and/or communication media.

The user interface devices 706 may include one or more devices with which a user accesses the computer system 700. The user interface devices 706 may include, but are not limited to, computers, servers, personal digital assistants, cellular phones, or any suitable computing devices. The I/O devices 708 enable a user to interface with the program modules 716. In one embodiment, the I/O devices 708 are operatively connected to an I/O controller (not shown) that enables communication with the processing unit 702 via the system bus 712. The I/O devices 708 may include one or more input devices, such as, but not limited to, a keyboard, a mouse, or an electronic stylus. Further, the I/O devices 708 may include one or more output devices, such as, but not limited to, a display screen or a printer.

The network devices 710 enable the computer system 700 to communicate with other networks or remote systems via a network, such as the network 104. Examples of the network devices 710 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such as a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 8:
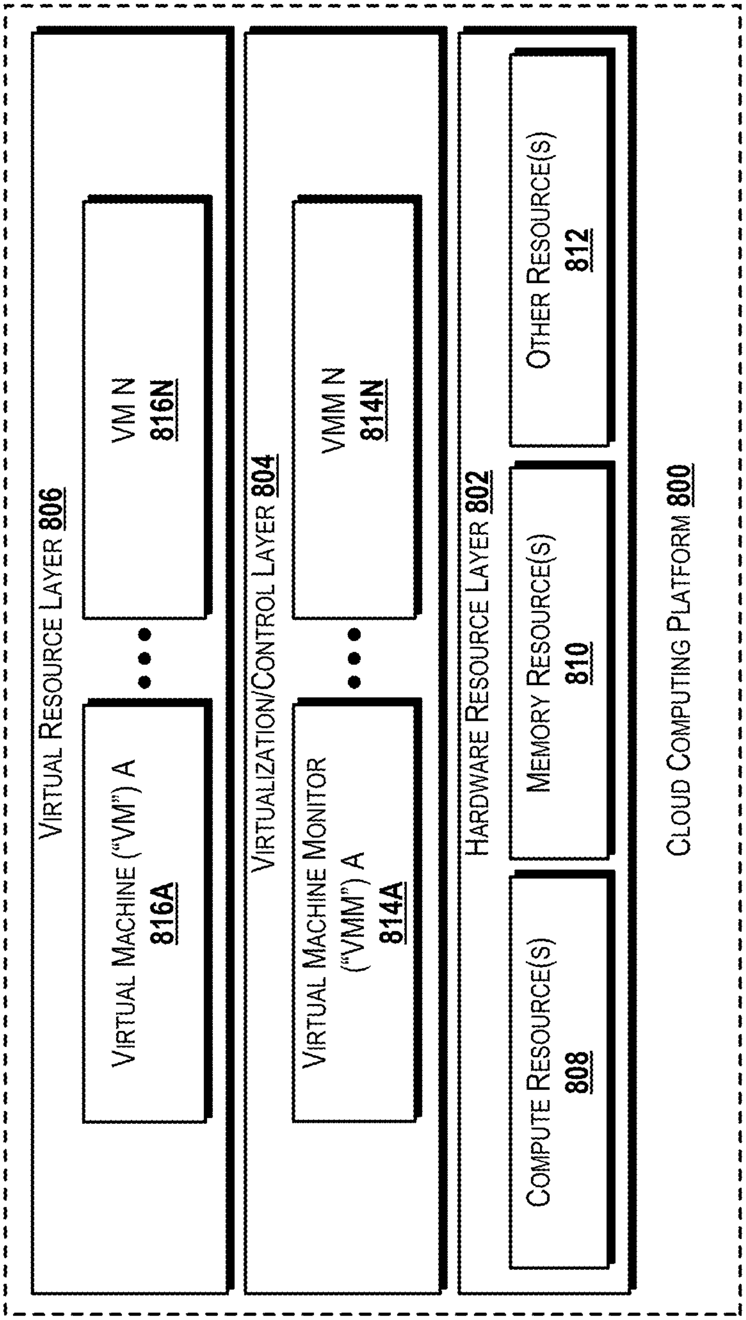
FIG. 8 is a diagram illustrating a computing environment capable of implementing aspects of the concepts and technologies disclosed herein, according to some illustrative embodiments of the concepts and technologies described herein.

FIG. 8 illustrates an illustrative architecture for a cloud computing platform 800 that can be capable of executing the software components described herein for providing an event-based analytics tool for networks and/or for interacting with the event-based analytics tool 106. Thus, it can be appreciated that in some embodiments of the concepts and technologies disclosed herein, the cloud computing platform 800 illustrated in FIG. 8 can be used to provide the functionality described herein with respect to the server computer 102, the data lake 110, the bus 112, the network devices 116, the user equipment 118, the NGXP server 124, the ELK stack 128, or other devices illustrated and described herein.

The cloud computing platform 800 thus may be utilized to execute any aspects of the software components presented herein. Thus, according to various embodiments of the concepts and technologies disclosed herein, the event-based analytics tool 106 and/or other software and/or modules can be implemented, at least in part, on or by elements included in the cloud computing platform 800 illustrated and described herein. Those skilled in the art will appreciate that the illustrated cloud computing platform 800 is a simplification of but only one possible implementation of an illustrative cloud computing platform, and as such, the illustrated cloud computing platform 800 should not be construed as being limiting in any way.

In the illustrated embodiment, the cloud computing platform 800 can include a hardware resource layer 802, a virtualization/control layer 804, and a virtual resource layer 806. These layers and/or other layers can be configured to cooperate with each other and/or other elements of a cloud computing platform 800 to perform operations as will be described in detail herein. While connections are shown between some of the components illustrated in FIG. 8, it should be understood that some, none, or all of the components illustrated in FIG. 8 can be configured to interact with one another to carry out various functions described herein. In some embodiments, the components are arranged so as to communicate via one or more networks such as, for example, the network 104 illustrated and described hereinabove (not shown in FIG. 8). Thus, it should be understood that FIG. 8 and the following description are intended to provide a general understanding of a suitable environment in which various aspects of embodiments can be implemented, and should not be construed as being limiting in any way.

The hardware resource layer 802 can provide hardware resources. In the illustrated embodiment, the hardware resources can include one or more compute resources 808, one or more memory resources 810, and one or more other resources 812. The compute resource(s) 808 can include one or more hardware components that can perform computations to process data, and/or to execute computer-executable instructions of one or more application programs, operating systems, services, and/or other software including, but not limited to, the event-based analytics tool 106, the data lake 110, the bus 112, the signature 120, the prediction model 132, the dashboard 134, and/or other software such as that illustrated and described herein.

According to various embodiments, the compute resources 808 can include one or more central processing units ("CPUs"). The CPUs can be configured with one or more processing cores. In some embodiments, the compute resources 808 can include one or more graphics processing units ("GPUs"). The GPUs can be configured to accelerate operations performed by one or more CPUs, and/or to perform computations to process data, and/or to execute computer-executable instructions of one or more application programs, operating systems, and/or other software that may or may not include instructions that are specifically graphics computations and/or related to graphics computations. In some embodiments, the compute resources 808 can include one or more discrete GPUs. In some other embodiments, the compute resources 808 can include one or more CPU and/or GPU components that can be configured in accordance with a co-processing CPU/GPU computing model. Thus, it can be appreciated that in some embodiments of the compute resources 808, a sequential part of an application can execute on a CPU and a computationally-intensive part of the application can be accelerated by the GPU. It should be understood that this example is illustrative, and therefore should not be construed as being limiting in any way.

In some embodiments, the compute resources 808 also can include one or more system on a chip ("SoC") components. It should be understood that an SoC component can operate in association with one or more other components as illustrated and described herein, for example, one or more of the memory resources 810 and/or one or more of the other resources 812. In some embodiments in which an SoC component is included, the compute resources 808 can be or can include one or more embodiments of the SNAPDRAGON brand family of SoCs, available from QUALCOMM of San Diego, California; one or more embodiment of the TEGRA brand family of SoCs, available from NVIDIA of Santa Clara, California; one or more embodiment of the HUMMINGBIRD brand family of SoCs, available from SAMSUNG of Seoul, South Korea; one or more embodiment of the Open Multimedia Application Platform ("OMAP") family of SoCs, available from TEXAS INSTRUMENTS of Dallas, Texas; one or more customized versions of any of the above SoCs; and/or one or more other brand and/or one or more proprietary SoCs.

The compute resources 808 can be or can include one or more hardware components arranged in accordance with an ARM architecture, available for license from ARM HOLDINGS of Cambridge, United Kingdom. Alternatively, the compute resources 808 can be or can include one or more hardware components arranged in accordance with an x86 architecture, such as an architecture available from INTEL CORPORATION of Mountain View, California, and others. Those skilled in the art will appreciate the implementation of the compute resources 808 can utilize various computation architectures and/or processing architectures. As such, the various example embodiments of the compute resources 808 as mentioned hereinabove should not be construed as being limiting in any way. Rather, implementations of embodiments of the concepts and technologies disclosed herein can be implemented using compute resources 808 having any of the particular computation architecture and/or combination of computation architectures mentioned herein as well as other architectures.

Although not separately illustrated in FIG. 8, it should be understood that the compute resources 808 illustrated and described herein can host and/or execute various services, applications, portals, and/or other functionality illustrated and described herein. Thus, the compute resources 808 can host and/or can execute the event-based analytics tool 106, the network devices 116, the data lake 110, the NGXP server 124, the ELK stack 128, or other applications or services illustrated and described herein.

The memory resource(s) 810 can include one or more hardware components that can perform or provide storage operations, including temporary and/or permanent storage operations. In some embodiments, the memory resource(s) 810 can include volatile and/or non-volatile memory implemented in any method or technology for storage of information such as computer-readable instructions, data structures, program modules, or other data disclosed herein. Computer storage media is defined hereinabove and therefore should be understood as including, in various embodiments, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium that can be used to store data and that can be accessed by the compute resources 808, subject to the definition of "computer storage media" provided above (e.g., as excluding waves and signals per se and/or communication media as defined in this application).

Although not illustrated in FIG. 8, it should be understood that the memory resources 810 can host or store the various data illustrated and described herein including, but not limited to, the correlated event data 108, the events 114, the signatures 120, the PCAP data 122, the logs 126, the prediction model 132, the dashboard 134, and/or other data, if desired. It should be understood that this example is illustrative, and therefore should not be construed as being limiting in any way.

The other resource(s) 812 can include any other hardware resources that can be utilized by the compute resources(s) 808 and/or the memory resource(s) 810 to perform operations. The other resource(s) 812 can include one or more input and/or output processors (e.g., a network interface controller and/or a wireless radio), one or more modems, one or more codec chipsets, one or more pipeline processors, one or more fast Fourier transform ("FFT") processors, one or more digital signal processors ("DSPs"), one or more speech synthesizers, combinations thereof, or the like.

The hardware resources operating within the hardware resource layer 802 can be virtualized by one or more virtual machine monitors ("VMMs") 814A-814N (also known as "hypervisors;" hereinafter "VMMs 814"). The VMMs 814 can operate within the virtualization/control layer 804 to manage one or more virtual resources that can reside in the virtual resource layer 806. The VMMs 814 can be or can include software, firmware, and/or hardware that alone or in combination with other software, firmware, and/or hardware, can manage one or more virtual resources operating within the virtual resource layer 806.

The virtual resources operating within the virtual resource layer 806 can include abstractions of at least a portion of the compute resources 808, the memory resources 810, the other resources 812, or any combination thereof. These abstractions are referred to herein as virtual machines ("VMs"). In the illustrated embodiment, the virtual resource layer 806 includes VMs 816A-816N (hereinafter "VMs 816").

Based on the foregoing, it should be appreciated that systems and methods for providing an event-based analytics tool for networks have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A system comprising:

a processor; and a memory that stores computer-executable instructions that, when executed by the processor, cause the processor to perform operations comprising:

obtaining, from a data lake, an instance of correlated event data, wherein the instance of correlated event data comprises a first event that occurred at a first network device, a second event that occurred at a second network device, and data that correlates the first event to the second event, wherein the first network device publishes the first event to a messaging bus, wherein the second network device publishes the second event to the messaging bus, wherein the first event and the second event are obtained by the data lake via the messaging bus, and wherein the second event results from an occurrence of the first event, obtaining packet capture data from a troubleshooting server, wherein obtaining the packet capture data comprises accessing, via a link in an event-based monitoring ("EBM") table, the troubleshooting server via a first application programming interface exposed by the troubleshooting server and pulling, via the first application programming interface, the packet capture data, obtaining an elasticsearch, logstash, and kibana ("ELK") log from a searchable log database comprising an ELK stack, wherein obtaining the ELK log comprises accessing the searchable log database via a second application programming interface exposed by the searchable log database and pulling, via the second application programming interface, the ELK log, generating, based on the instance of correlated event data, the packet capture data, and the ELK log, a prediction model, and providing, to the prediction model as input, a future event, wherein output from the prediction model comprises a cause of the future event, and wherein the prediction model enables proactive and predictive remediation of the cause of the future event.

2. The system of claim 1, wherein the first network device comprises an access management function, and wherein the first event comprises an EBM event from the EBM table.

3. The system of claim 1, wherein the first network device comprises a session management function, and wherein the first event comprises an endpoint detecting and response event.

4. The system of claim 1, wherein the first network device comprises a gNodeB, and wherein the first event comprises a per-call measurement data event.

5. The system of claim 1, wherein the computer-executable instructions, when executed by the processor, cause the processor to perform operations further comprising:

detecting a third event, wherein the third event relates to an occurrence of the future event after the prediction model is generated;

feeding, to the prediction model, the third event as input to the prediction model; and obtaining, as output from the prediction model, the cause of the third event.

6. The system of claim 5, wherein the computer-executable instructions, when executed by the processor, cause the processor to perform operations further comprising:

triggering remediation of the cause of the third event.

7. The system of claim 5, wherein the computer-executable instructions, when executed by the processor, cause the processor to perform operations further comprising:

automatically triggering remediation of the cause of the third event based on the prediction model.

8. A method comprising:

obtaining, by a device comprising a processor and from a data lake in communication with the device via a network connection, an instance of correlated event data, wherein the instance of correlated event data comprises a first event that occurred at a first network device, a second event that occurred at a second network device, and data that correlates the first event to the second event, wherein the first network device publishes the first event to a messaging bus, wherein the second network device publishes the second event to the messaging bus, wherein the first event and the second event are obtained by the data lake via the messaging bus, and wherein the second event results from an occurrence of the first event;

obtaining, by the device, packet capture data from a troubleshooting server, wherein obtaining the packet capture data comprises accessing, via a link in an event-based monitoring ("EBM") table, the troubleshooting server via a first application programming interface exposed by the troubleshooting server and pulling, via the first application programming interface, the packet capture data;

obtaining, by the device, an elasticsearch, logstash, and kibana ("ELK") log from a searchable log database comprising an ELK stack, wherein obtaining the ELK log comprises accessing the searchable log database via a second application programming interface exposed by the searchable log database and pulling, via the second application programming interface, the ELK log;

generating, by the device and based on the instance of correlated event data, the packet capture data, and the ELK log, a prediction model; and providing, by the device and to the prediction model as input, a future event, wherein output from the prediction model comprises a cause of the future event, and wherein the prediction model enables proactive and predictive remediation of the cause of the future event.

9. The method of claim 8, wherein the first network device comprises an access management function, and wherein the first event comprises an EBM event from the EBM table.

10. The method of claim 8, wherein the first network device comprises a session management function, and wherein the first event comprises one of an endpoint detecting and response event.

11. The method of claim 8, wherein the first network device comprises a gNodeB, and wherein the first event comprises a per-call measurement data event.

12. The method of claim 8, further comprising:

detecting the a third event, wherein the third event relates to an occurrence of the future event after the prediction model is generated;

feeding, to the prediction model, the third event as input to the prediction model;

obtaining, as output from the prediction model, the cause of the third event; and triggering remediation of the cause of the third event.

13. The method of claim 8, further comprising:

detecting the a third event, wherein the third event relates to an occurrence of the future event after the prediction model is generated;

feeding, to the prediction model, the third event as input to the prediction model;

obtaining, as output from the prediction model, the cause of the third event; and automatically triggering remediation of the cause of the third event based on the prediction model.

14. A computer storage medium having computer-executable instructions stored thereon that, when executed by a processor, cause the processor to perform operations comprising:

obtaining, from a data lake, an instance of correlated event data, wherein the instance of correlated event data comprises a first event that occurred at a first network device, a second event that occurred at a second network device, and data that correlates the first event to the second event, wherein the first network device publishes the first event to a messaging bus, wherein the second network device publishes the second event to the messaging bus, wherein the first event and the second event are obtained by the data lake via the messaging bus, and wherein the second event results from an occurrence of the first event;

obtaining packet capture data from a troubleshooting server, wherein obtaining the packet capture data comprises accessing, via a link in an event-based monitoring ("EBM") table, the troubleshooting server via a first application programming interface exposed by the troubleshooting server and pulling, via the first application programming interface, the packet capture data;

obtaining an elasticsearch, logstash, and kibana ("ELK") log from a searchable log database comprising an ELK stack, wherein obtaining the ELK log comprises accessing the searchable log database via a second application programming interface exposed by the searchable log database and pulling, via the second application programming interface, the ELK log;

generating, based on the instance of correlated event data, the packet capture data, and the ELK log, a prediction model; and providing, to the prediction model as input, a future event, wherein output from the prediction model comprises a cause of the future event, and wherein the prediction model enables proactive and predictive remediation of the cause of the future event.

15. The computer storage medium of claim 14, wherein the first network device comprises an access management function, and wherein the first event comprises an EBM event from the EBM table.

16. The computer storage medium of claim 14, wherein the first network device comprises a session management function, and wherein the first event comprises an endpoint detecting and response event.

17. The computer storage medium of claim 14, wherein the first network device comprises a gNodeB, and wherein the first event comprises a per-call measurement data event.

18. The computer storage medium of claim 14, wherein the computer-executable instructions, when executed by the processor, cause the processor to perform operations further comprising:

detecting a third event, wherein the third event relates to an occurrence of the future event after the prediction model is generated;

feeding, to the prediction model, the third event as input to the prediction model; and obtaining, as output from the prediction model, the cause of the third event.

19. The computer storage medium of claim 18, wherein the computer-executable instructions, when executed by the processor, cause the processor to perform operations further comprising:

triggering remediation of the cause of the third event.

20. The computer storage medium of claim 18, wherein the computer-executable instructions, when executed by the processor, cause the processor to perform operations further comprising:

automatically triggering remediation of the cause of the third event based on the prediction model.

* * * * *